United States Patent [19]

Gorenflo et al.

[11] 4,393,401
[45] Jul. 12, 1983

[54] METHOD AND APPARATUS FOR DIMENSIONALLY MEASURING ARTICLES

[75] Inventors: Donald L. Gorenflo; William D. Noblit, III, both of Marion, Ohio

[73] Assignee: The Fairchild Engineering Company, Marion, Ohio

[21] Appl. No.: 205,319

[22] Filed: Nov. 10, 1980

[51] Int. Cl.³ ............................................. H04N 7/18
[52] U.S. Cl. ................................... 358/107; 250/560; 356/397; 356/401
[58] Field of Search ............... 358/101, 107; 250/560; 356/394, 396, 397, 401; 414/748

[56] References Cited

U.S. PATENT DOCUMENTS 3,432,076  3/1969  Arsenault ........................... 414/748
4,033,697  7/1977  Pfoutz ................................. 250/560

FOREIGN PATENT DOCUMENTS 55-70708  5/1980  Japan ................................. 250/560
934215    8/1963  United Kingdom ............... 358/107

OTHER PUBLICATIONS

Dehmel et al.-Automated Tape Width Measurement-IBM Tech. Disclosure Bull. vol. 8 #2 Jul. 1965 pp. 274-275.

Primary Examiner—Joseph A. Orsino, Jr.
Attorney, Agent, or Firm—Buell, Blenko, Ziesenheim & Beck

[57] ABSTRACT

The specification discloses dimensional measurement of articles such as tubing. The edges of the article and an adjacent reference scale are scanned by video camera means. From the relative positions of the edges of the article and the reference scale, the dimension of the article is computed without physically contacting it.

8 Claims, 6 Drawing Figures

METHOD AND APPARATUS FOR DIMENSIONALLY MEASURING ARTICLES

This invention relates to measuring the physical size of various articles. More particularly the invention relates to measuring the length of tubing with great precision and without physical contact with the tubing.

The precise measurement of the dimension of various articles is often difficult to do on a production basis. Manually measuring the length by a use of a tape or tool is slow and subject to error. Where the task must be performed repetitively as in a mill, devices which measure length by rolling a wheel or disk along the article, such as a length of tube, have been highly refined. A shortcoming of such devices is that they are active only when the tubing is moved longitudinally past a measuring point. Moreover, such devices are subject to inaccuracies due to the presence or buildup of oil, dirt, mill scale and the like around the measuring wheel. Since length can be measured only as the tube moves longitudinally there is necessarily a length of table or conveyor included within the line which is at least as great as the length of the tubing to be measured.

We have invented new and useful improvements in size measuring which avoid many of the existing problems and make possible precise measurement of size without physically contacting the product. We provide a table for holding the article, a reference scale adjacent the table and video camera means directed at the ends of the article and the reference scale. We further provide video digitizer means connected to the camera means and fixing the relative position of each end of the article and the adjacent reference scale. We further provide means for computing the output of the digitizing means and converting the digital signals to a length. We may provide printer means for printing identifying tags with the measured dimensions. We prefer to provide table means down which articles are advanced one at a time to a measuring station.

We preferably provide stops which hold one article at the measuring station for measurement and then release the same. We further provide stops which may be operated to release a signal from a holding station to the measuring station. We further prefer to provide two video camera means, one for each end of the article. We prefer to sense the location of the ends of the article and to shift each video camera means until an end of the article is approximately centered in the view of the video camera. We may further provide screens for display of the image seen by the video camera means and also the computer output.

For convenience we refer to measuring the "length" of articles and to sensing the location of the "ends" thereof. It will be apparent, however, that the width or height or other dimension may be measured by sensing the locations of the sides, top, bottom, or other identifiable portion of the article, and those terms are used interchangeably herein.

Other details, objects and advantages of our invention will become more apparent as the following description of a present preferred embodiment preceeds.

In the accompanying drawings we have illustrated a present preferred embodiment of our invention in which.

Figure 1:
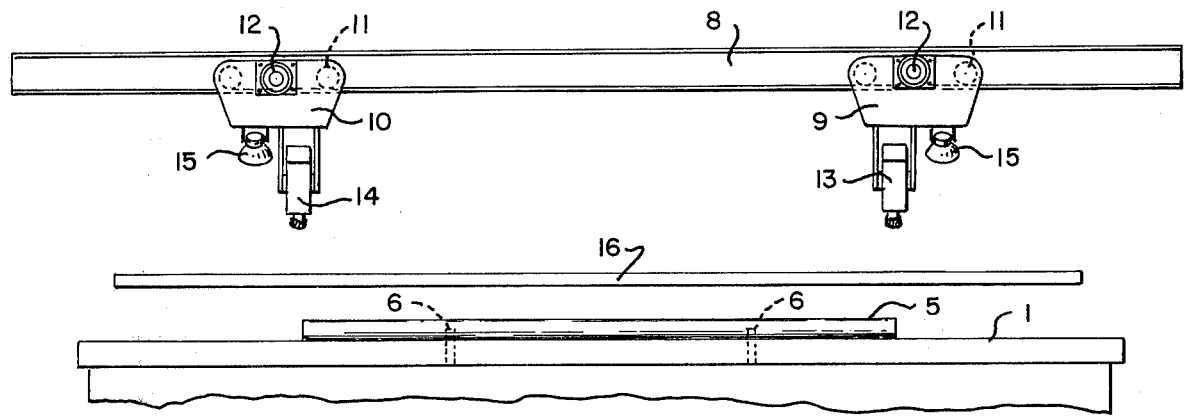
FIG. 1 is a schematic front elevational view of apparatus embodying our invention used for measuring the length of tubing.
Figure 2:
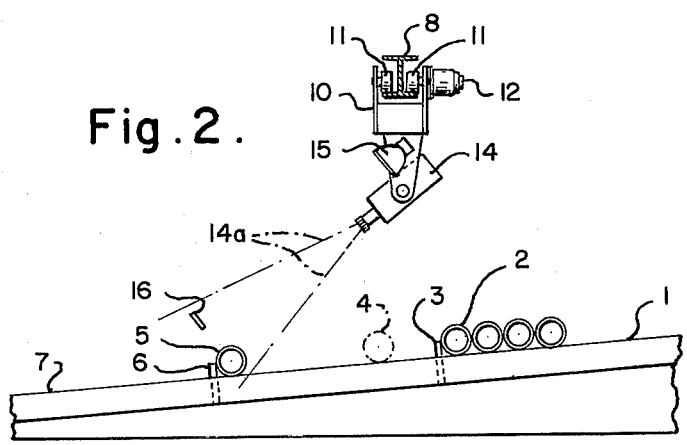
FIG. 2 is a schematic end elevational view of a apparatus shown in FIG. 1.

Tubing whose length is to be measured is rolled across a table 1, one length at a time. The tube lengths are first delivered from a run out table or the like and roll by gravity to a holding station 2 where they are brought to rest by one or more stops 3. Stops 3 are selectively retracted to allow one length to roll along table 1 as shown at 4 to a measuring station 5. The tube is held at measuring station 5 by one or more stops 6 which are selectively retracted after measuring to allow the tube 5 to roll by gravity on to exit section 7 of table 1.

A track 8 is mounted above table 1. Two carriages 9 and 10 are movably supported on track 8 by wheels 11. Each carriage is driven along track 8 by a motor 12. Carriages 9 and 10 carry video cameras 13 and 14, respectively. A flood light 15 is mounted on each carriage aligned with the associated video camera.

Figure 3:
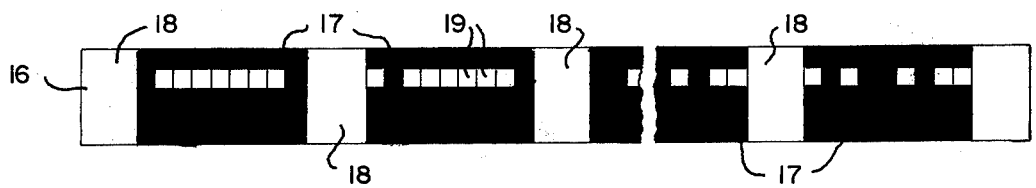
FIG. 3 is a drawing of portion of a reference scale used to determine the length of tubes being measured.

A reference scale 16 is mounted above measuring station 5. Reference scale 6 is located so that video cameras 13 and 14 will scan both the tube at measuring station 5 and reference scale 16 as shown by lines 14a which indicate the field of view of camera 14. Scale 16 is shown in greater detail in FIG. 3. It comprises a series of cells 17 formed on a flat surface. The surface is generally black with markings on it which are in white for maximum contrast. Each cell consists of a white stripe 18 which extends across the width of scale 16, and nine square blocks 19. Stripes 18 and 1½ inches wide and each of blocks 19 is ½ inch in size. Thus the distance is 6 inches from one edge of one stripe 18 to the same edge of the next adjacent stripe 18. In each cell one or more of blocks 19 is colored black. The pattern is different in each cell so that each cell may be uniquely identified by the pattern of black blocks 19 within the cell.

Camera 13 is connected by cable 20 to a video digitizer 21 which converts the image seen by the video camera to a digital output. A cathode ray tube mounted 22 visually shows the image seen by the video camera 13. The video information in digital form is transmitted from digitizer 21 through cable 23 to a computer 24. Camera 14 is connected in the same way to computer 24 through another video digitizer 21 having an associated monitor 22. A terminal 25 including a cathode ray tube display screen and a standard key board is connected to computer 24. A printer 26 is connected to computer 24 to print out production records. A tag printer 27 is also connected to computer 24 to print paper, plastic or metal tag for individual tubes or bundles of tubes.

Computer 24 is connected by cable 28 to interface device 29. Interface 29 receives signals through cable 13 from position limits which are actuated by movement of carriages 9 and 10. Interface 29 also receives signals through cable 31 from operator manual controls. Carriage drive motors 12 are connected to interface device 29.

Tube lengths which roll across extension 7 of table 1 are delivered to a bundler equipped with one or more load cell 32 which weigh the bundle. Load cells 32 are connected by cable 33 to computer 24.

Figure 6:
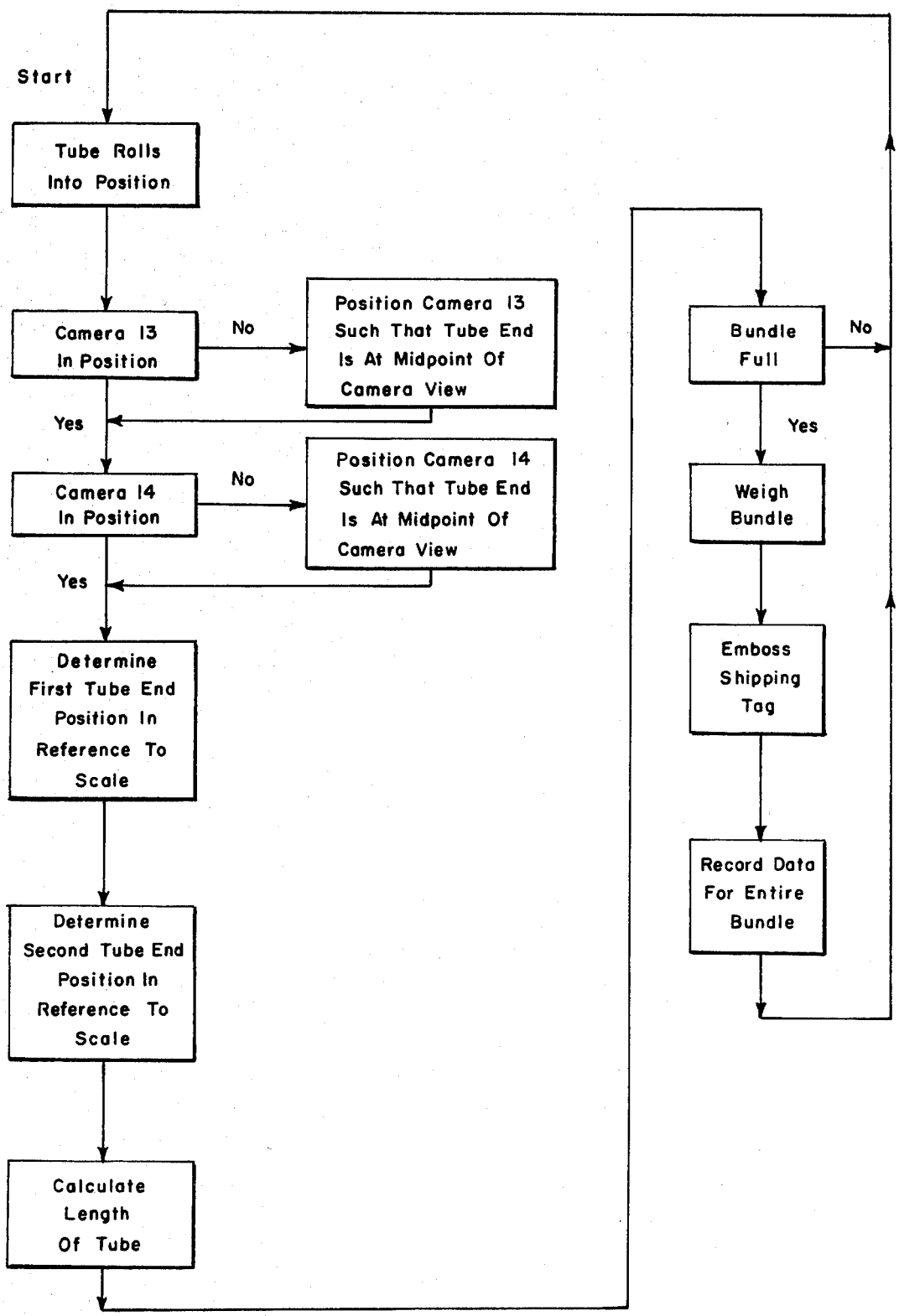
FIG. 6 is a flow diagram showing the operation of the tube measuring apparatus.

Cameras 13 and 14 are focused on reference scale 16 and the tube at measuring station 5. The lens and distance from the camera to the reference scale are selected to bring the reference scale and the tube into focus and to throw the background out of focus. Light provided by flood lights 15 will be reflected from the white markings on reference scale 16 and from the tube, and will thereby be seen by the video cameras. Each video camera scans an area 16 inches square. Each video camera employs 1,024 scanning positions or "pixels" in each direction. Since the field of view is 16 inches square there are 64 pixels per inch and each pixel represents a linear distance of 0.015625 inches on the reference scale. The operating sequence is outlined diagrammatically in FIG. 6.

Figure 4:
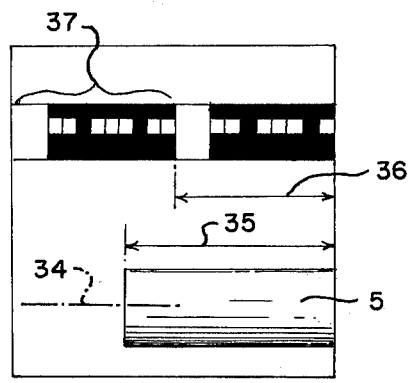
FIG. 4 is a view showing one end of a length of tube in juxtaposition to a portion of the reference scale as seen by a video camera.
Figure 5:
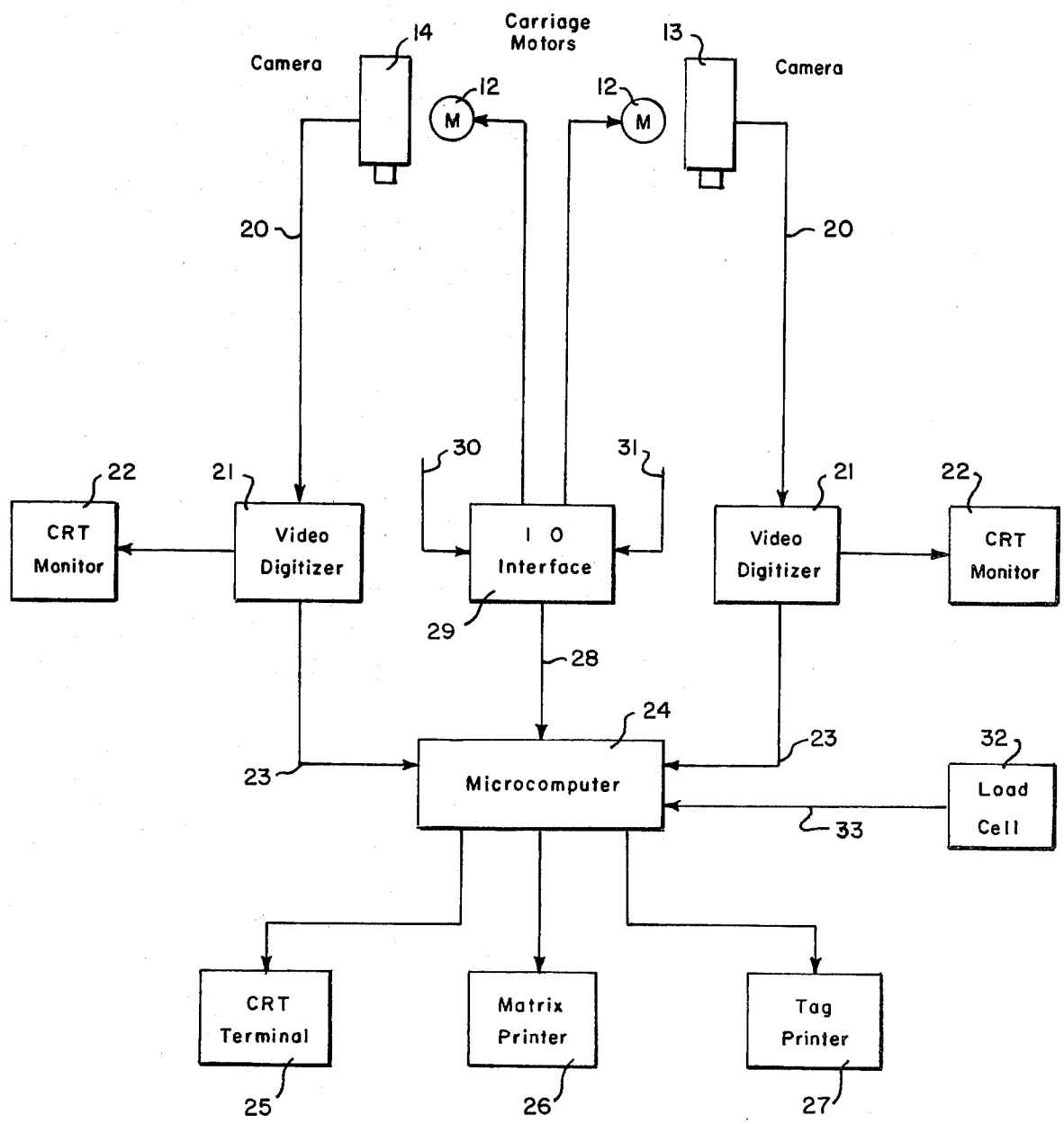
FIG. 5 is an equipment block diagram of apparatus embodying the invention.

In operation lengths of tubing are delivered to table 1 where they roll against stops 3, at holding station 2. Stops 3 are retracted to allow one tubing length to roll into measuring position 5 against stops 6. Each camera scans along an axis 34, upon which the tube is located when in measuring position 5. Light will be reflected by the tube but not by the background. When the end of the tube is approximately centered in the view of the video camera as shown in FIG. 4, the pixels along axis 34 will register an image from the edge of the video camera picture to the end of the tube a dimension indicated at 35. The information is converted to digital form in digitizer 21 and fed to computer 24. If the distance 35 is approximately half the distance across the screen along axis 34, i.e. approximately 512 pixels, the camera will stay in position. If the end of the tube is not approximately centered, computer 24 will energize motor 12 to shift the camera until the end of the tube is approximately centered in the view of the video camera. Each camera is separately positioned in the same manner. The distance 36 from the edge of the camera view to the end of the nearest reference cell 37 is determined by a reference to the white stripe. The particular reference cell is determined by reading the unique combination of white and black blocks in the reference cell. The difference between the number of pixels in dimension 35 and those in dimension 36 when multiplied by 0.015625 inches (the size of one pixel) will fix the tube end position relative to reference cell 37. A similar scan made at the opposite end of the tube length will fix the position of that end of the tube relative to another reference cell and will also identify the second reference cell. Since the distance between the reference cells is known, the length of the tube can be precisely computed without physically contacting the tube.

After the computation has been made stops 6 are withdrawn to allow the tube to roll across table extension 7 to a bundling station. If the bundle is not full the process is repeated. When a full bundle has been assembled the bundle is weighed by load cell 32 and a shipping tag is printed by printer 27. Data for the bundle and for individual tubes, if desired, is recorded by printer 26.

While we have illustrated and described a present preferred embodiment of our invention it is to be understood that we do not limit ourselves thereto and that our invention may be otherwise variously practiced within the scope of the following claims.

We claim:

1. Apparatus for measuring a dimension of an article comprising a table for holding the article, a reference scale adjacent the table, a plurality of reference points on the scale, each reference point having a different code sequence to represent a different position on the scale, video camera means directed at each end of the distance to be measured and the reference scale, video digitizer means connected to the camera means and fixing the relative positions of one end of the distance to be measured from a reference point in digital form for each camera means, and computing means receiving the output of the digitizing means and computing therefrom the dimension of the article.

2. The apparatus of claim 1 in which the video camera means are adjustable axially of the dimension to be measured to a position in which an end of the dimension to be measured is centered in the view of the camera means.

3. The apparatus of claim 1 in which the reference scale comprises a plurality of uniquely coded reference cells.

4. Apparatus for measuring the length of a tube and the like comprising a tube holding station, a tube measuring station, means operable to release one tube from the holding station for movement to the tube measuring station, a reference scale positioned adjacent the measuring station, said reference scale comprising a plurality of uniquely coded reference cells, each reference cell having a different code sequence to represent a different position on the scale, at least one video camera focused upon a tube at the measuring station and the adjacent reference scale, digitizer means receiving a signal from the video camera and having an output signal which represents the position of the tube end relative to an adjacent reference cell, and means receiving the output signal and computing the length of the tube therefrom.

5. The apparatus of claim 4 in which a video camera means at each end of the tube provides a signal to digitizer means from which the tube length is computed.

6. The apparatus of claim 5 in which at least one of the video camera means is movable axially of the tube whereby the ends of tubes of varying length are brought within the field of view of the camera for measurement.

7. The method of measuring the length of an elongate article which comprises positioning the elongate article adjacent to a reference scale, said reference scale comprising a plurality of uniquely coded reference points, each reference point having a different code sequence to represent a different position on the scale, scanning each end of the elongate article and adjacent scale unit with a video camera, determining the distance from a reference point on the scale to an end of the elongate article, determining the distance from another reference point on the scale to the other end of the article, determining the distance between the reference points, and computing the length of the elongate article from the distance between the ends of the article and the respective reference points and the distance between the reference points.

8. The method of measuring the length of a tube and the like which comprises placing one or more length of tubing at a holding station, releasing one tube length only to a measuring station adjacent to a linear measuring scale, said measuring scale comprising a plurality of uniquely coded reference points, each reference point having a different code sequence to represent a different position on the scale, scanning at least one end of the tube and the measuring scale adjacent thereto, determining from the video signals the distance between said end and a reference point on the linear scale and the distance between the reference point and the other end of the tube, and computing therefrom the length of the tube.

* * * * *

UNITED STATES PATENT AND TRADEMARK OFFICE
CERTIFICATE OF CORRECTION

PATENT NO. : 4,393,401

DATED : July 12, 1983

INVENTOR(S) : Donald L. Gorenflo and William D. Noblit, III

It is certified that error appears in the above-identified patent and that said Letters Patent is hereby corrected as shown below:

Column 2, line 39, after "18", "and" should be --are--.

Signed and Sealed this

First Day of November 1983

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,393,401

DATED : July 12, 1983

INVENTOR(S) : Donald L. Gorenflo and William D. Noblit, III

It is certified that error appears in the above-identified patent and that said Letters Patent is hereby corrected as shown below:

On the Title Page, the assignee should read --The Fairfield Engineering Company--.

Signed and Sealed this

Thirty-first Day of January 1984

[SEAL]

Attest:

GERALD J. MOSSINGHOFF

Attesting Officer     Commissioner of Patents and Trademarks